(12) United States Patent
Chen et al.

(10) Patent No.: US 7,328,483 B2
(45) Date of Patent: Feb. 12, 2008

(54) HINGE ASSEMBLY WITH UNIVERSALLY BIASED CAM

(75) Inventors: Yong-Jian Chen, Shenzhen (CN); Xing-Bing Zou, Shenzhen (CN)

(73) Assignees: Hong Fu Jin Precision Industry (Shenzhen) Co., Ltd., Bao-an District, Shenzhen, Guangdong Provience (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 314 days.

(21) Appl. No.: 10/952,083

(22) Filed: Sep. 28, 2004

(65) Prior Publication Data
US 2005/0132534 A1   Jun. 23, 2005

(30) Foreign Application Priority Data
Dec. 19, 2003   (TW) ................ 92222293 U

(51) Int. Cl.
*E05F 1/08* (2006.01)
(52) U.S. Cl. .......................... 16/303; 16/330
(58) Field of Classification Search .................. 16/330, 16/303, 312–314, 318; 379/433.13, 433.12; 455/575.1, 575.3; 361/680–683
See application file for complete search history.

(56) References Cited

U.S. PATENT DOCUMENTS 3,367,613 A * 2/1968 Christensen ................ 248/145
5,600,868 A * 2/1997 Tourville et al. .............. 16/277
6,148,079 A * 11/2000 Chintala et al. ........ 379/433.13
2004/0237259 A1* 12/2004 Huang et al. .................. 16/330
2004/0244147 A1* 12/2004 Qin et al. ...................... 16/330
2004/0261224 A1* 12/2004 Li et al. ........................ 16/330
2005/0138771 A1* 6/2005 Su ................................ 16/330

FOREIGN PATENT DOCUMENTS

| JP | 2000017932 A | * | 1/2000 |
| JP | 2000320532 A | * | 11/2000 |
| JP | 2000345762 A | * | 12/2000 |
| JP | 2004044665 A | * | 2/2004 |
| WO | WO 3044974 A1 | * | 5/2003 |

* cited by examiner

*Primary Examiner*—Chuck Y. Mah
(74) *Attorney, Agent, or Firm*—Morris Manning Martin LLP; Tim Tingkang Xia, Esq.

(57) ABSTRACT

A hinge assembly (9) includes a shell (1), a coil spring (2), a shaft (3), and two bolts (4). The shell defines a cavity (12) therein, with one end of the shell being closed and the other end being open. Two holes (14) are defined in the shell near the open end. The shaft includes a cam (32), a soleplate (38), and an interconnecting neck (34). The cam includes a cam surface (324) at one end thereof, the cam surface including peaks and valleys. The spring and the shaft are received in the shell, but with the soleplate exposed outside. The spring biases the cam surface against the bolts no matter what part of the cam surface abuts the bolts. Because the hinge assembly of the present invention is effectively an integrated, modular structure, it is easily incorporated into a portable foldable device such as a mobile phone.

20 Claims, 3 Drawing Sheets

HINGE ASSEMBLY WITH UNIVERSALLY BIASED CAM

CROSS-REFERENCE TO RELATED APPLICATIONS

This application is related to a copending U.S. patent application Ser. No. 10/951,512 filed on Sep. 28, 2004, entitled "HINGE ASSEMBLY WITH CAMMED DRIVING", filed on the same date with the same applicant and assignee as the invention. The disclosure of the above identified applications is incorporated herein by reference.

BACKGROUND OF THE INVENTION

1. Field of the Invention

The present invention relates to apparatuses for hinging the housings of portable foldable devices together, such as the housings of a foldable mobile phone.

2. Description of Prior Art

A typical mobile phone has two housings joined by a type of hinge that allows the housings to fold upon one another. Many such folding mobile phones have most of the electronics accommodated in one housing called the main housing, and only a few electronics accommodated in the other housing called the cover. Other such folding mobile phones have all the electronics in the main housing, with the cover serving only to cover a keypad and/or a display of the main housing.

FIG. 4 illustrates a hinge assembly used in a conventional mobile phone 6. The mobile phone 6 comprises a main housing 62 and a cover 64. The hinge assembly comprises two cams 50, 52, a spring 54, and a pair of posts 66 contained in the main housing 62. A channel 642 is defined through an end of the cover 64. The cam 52, the spring 54, and the cam 50 are fixed in the channel 642 in that order. The cams 50, 52 protrude out from the channel 642 and engage with the posts 66. When the cover 64 is rotated, the cams 50, 52 rotate along with the cover 64, and stop the cover 64 in a position where it maintains an angle of 180 degrees relative to the main housing 62. However, the hinge assembly comprises a variety of individual pieces that must be installed with the mobile phone when the mobile phone is assembled. This does not meet the growing trend for mobile phone manufacturers to use integrated one-piece hinge assemblies that can be quickly and easily press-fitted into mobile phone sub-assemblies during manufacturing. Manufacturing costs associated with non-integrated hinge assemblies are higher than those associated with one-piece hinge assemblies.

Thus, a hinge assembly having an integrated structure which can overcome the above-described disadvantage is desired.

SUMMARY OF THE INVENTION

An object of the present invention is to provide a hinge assembly having a relatively simple structure which can reduce costs.

To accomplish the above-mentioned object, the present invention provides a hinge assembly as follows. In a preferred embodiment, the hinge assembly comprises a shell, a spring, a shaft and two bolts. The shell defines a cavity therein, with one end of the shell being closed and the other end being open. Two holes are defined in the shell near the open end. The shaft comprises a cam, a soleplate, and a neck connecting the cam and the soleplate. The cam comprises a cam surface at one end thereof, the cam surface including peaks and valleys. The spring and the shaft are received in the shell, but with the soleplate exposed outside. The spring biases the cam surface against the bolts no matter what part of the cam surface abuts the bolts.

Because the hinge assembly of the present invention is effectively an integrated, modular structure, it is easily incorporated into a portable foldable device such as a mobile phone, and can reduce costs accordingly.

Other objects, advantages and novel features of the present invention will be drawn from the following detailed description with reference to the attached drawings, in which:

DETAILED DESCRIPTION OF THE PREFERRED EMBODIMENT

Figure 1:
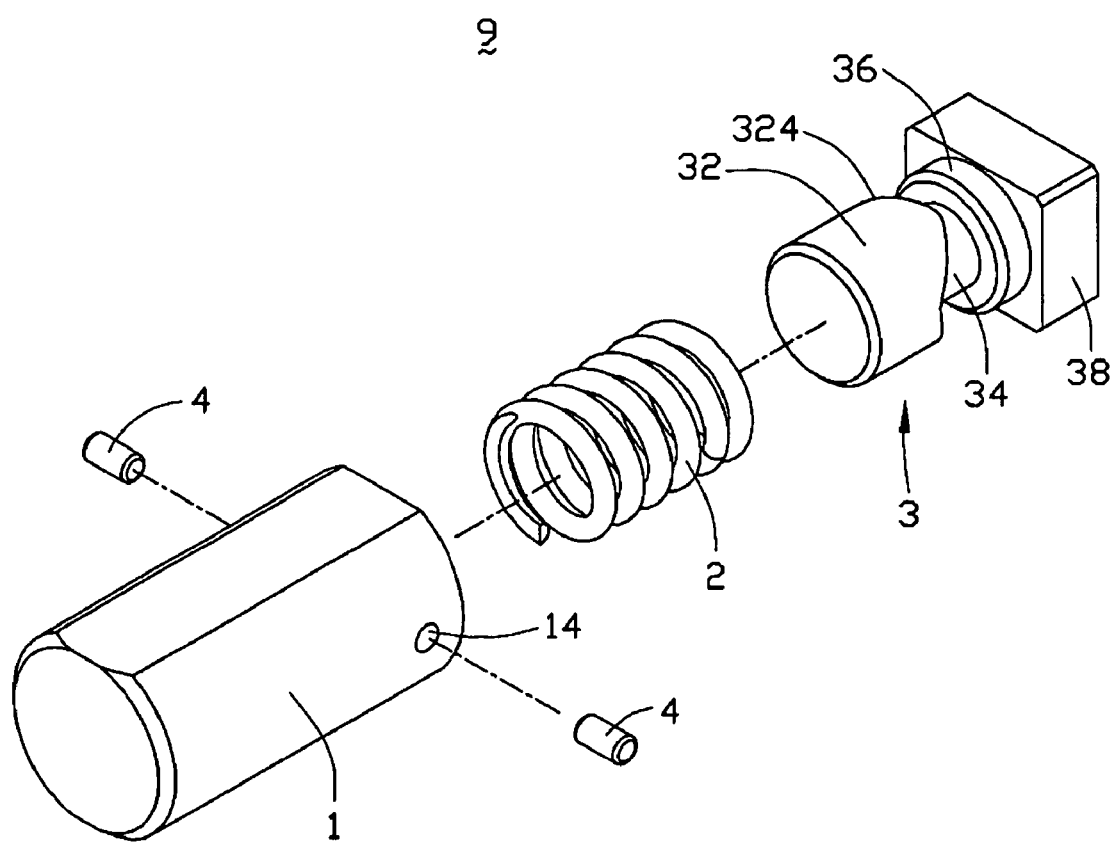
FIG. 1 is an exploded, isometric view of a hinge assembly in accordance with the present invention, the hinge assembly including a shell, a spring, a shaft and two bolts.

Referring now to the drawings in detail, FIG. 1 shows a hinge assembly 9 of the present invention. The hinge assembly 9 comprises a shell 1, a coil spring 2 used as a flexible member, a shaft 3, and two bolts 4.

The shell 1 as a first rotary member is generally a cylinder with two parallels, symmetrically opposite planar surfaces, so that it can be fixedly retained in a mobile phone. A cylindrical cavity 12 (see FIG. 2) is defined in the shell 1. One end of the shell 1 is closed, and the other end is open. A pair of aligned holes 14 is defined in the shell 1 near the open end thereof. The spring 2 is made of metal.

The shaft 3 as a second rotary member includes a cam 32, a neck 34, a circular platform 36, and a soleplate 38. The cam 32 is generally cylindrical. One end of the cam 32 has a cam surface 324, which includes peaks and valleys (not labeled). The cam surface 324 adjoins one end of the neck 34. An opposite end of the neck 34 connects with the circular platform 36, which is set on a middle of the soleplate 38. A diameter of the cam 32 and a diameter of the circular platform 36 are both slightly less than a diameter of the cavity 12, and are both greater than a diameter of the neck 34.

Each bolt 4 is columnar, and is made of metal or plastic. A diameter of each bolt 4 is slightly greater than a diameter of the holes 14.

Figure 2:
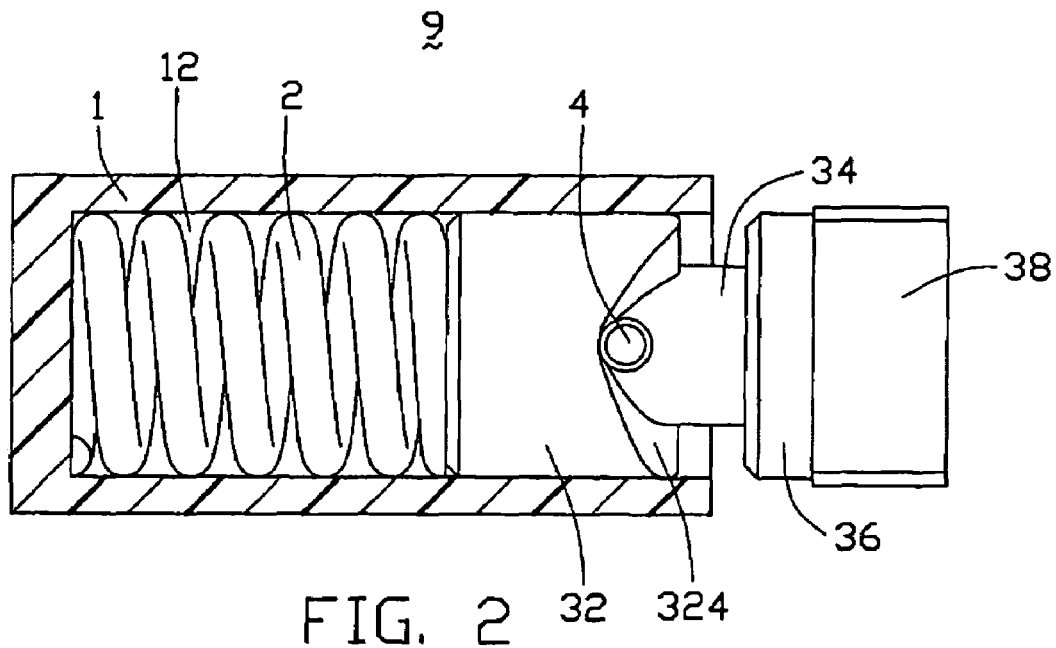
FIG. 2 is an assembled, side elevation of the hinge assembly of FIG. 1, with the shell cut away.
Figure 3:
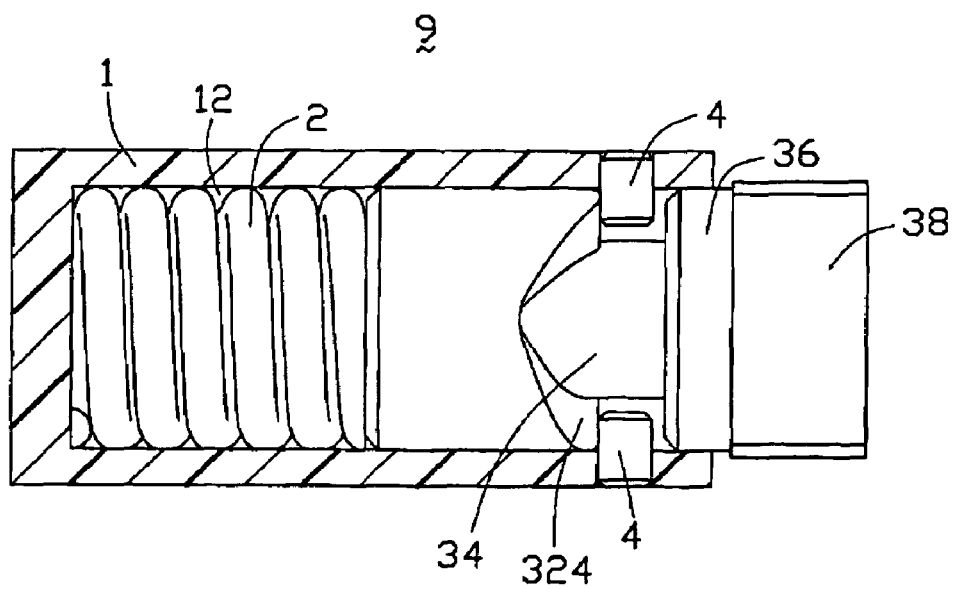
FIG. 3 is similar to FIG. 2, but shown with the shell rotated 90 degrees relative to the shaft.
Figure 4:
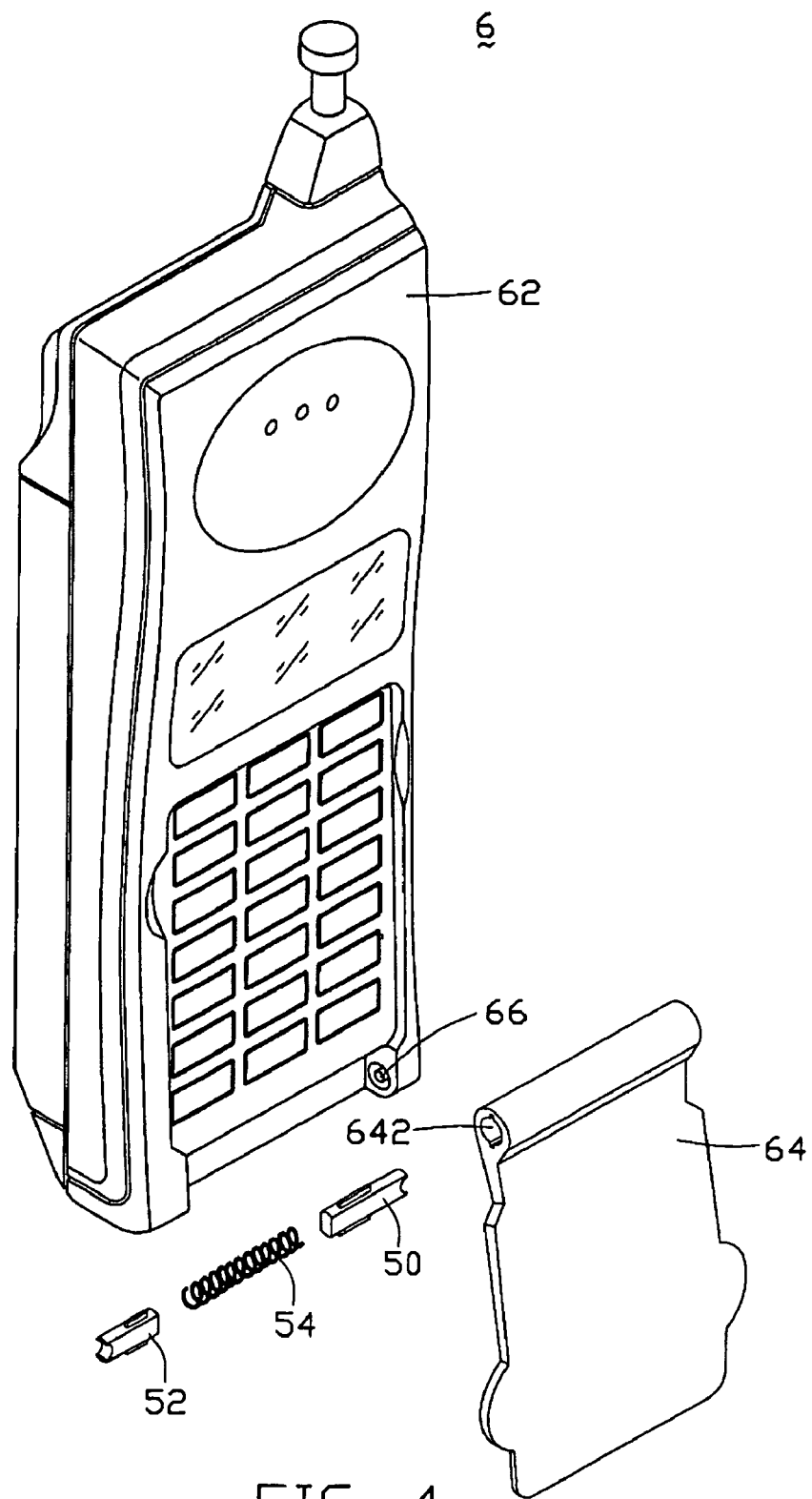
FIG. 4 is an exploded, isometric view of a mobile phone with a hinge assembly of the prior art.

Referring to FIGS. 2-3, in assembly, first, the spring 2 and the shaft 3 are inserted into the cavity 12 in that order, with the soleplate 38 and the circular platform 36 exposed outside the shell 1. The soleplate 38 is pressed so that the circular platform 36 enters the cavity 12, with the spring 2 being compressed. The bolts 4 are inserted into the holes 14, and are force-fitted in the holes 14 such that they protrude into the cavity 12 as a protruding portion therein. The soleplate 38 is then released. The spring 2 rebounds only slightly, pushing the shaft 3 against the bolts 4. No matter what part of the cam surface 324 abuts the bolts 4, the spring 2 biases the cam surface 324 against the bolts 4. Finally, the shell 1 is engaged in a generally tubular socket of a cover of a mobile phone (not shown), and the soleplate 38 is fixed in a main body of the folding mobile phone. When the cover of the mobile phone is in either a closed position or an open position, the bolts 4 are retained in the valleys of cam surface 324 (see FIG. 2), and the hinge assembly 9 is stably held in position.

In use, when the cover is manually rotated between the open position and the closed position, or vice versa, the shell 1 rotates along with the cover. Thus the bolts 4 rotate along with the shell 1. Because the soleplate 38 is fixed with the main body, the bolts 4 ride along the cam surface 324 from the valleys to corresponding peaks. In this process, the spring 2 is further compressed. Once the bolts 4 have passed over the peaks, the bolts 4 automatically ride down into corresponding valleys by reason of decompression force applied by the spring 2, with no further need for manual rotation of the cover. Thus the bolts 4 are retained in the valleys, and the cover is stably held in the respective open or closed position.

Because the hinge assembly 9 is effectively an integrated, modular structure, it is easily incorporated into the mobile phone or another kind of portable foldable device, and can reduce costs accordingly. In another alternative embodiment, the blots 4 are installed on the shaft 3 and the cam surface 324 is formed on the inner face of the cavity 12 of the shell 1.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge assembly comprising:
   a shell having an open end, the shell defining a cavity therein and at least one hole near the open end;
   a spring;
   a shaft comprising a cam, a soleplate, and a neck interconnecting the cam and the soleplate, the cam comprising a cam surface at one end thereof, the cam surface including peaks and valleys; and
   at least one bolt received in said at least one hole and extending into the cavity;
   wherein the spring and the shaft are received in the shell with the soleplate exposed outside the shell, and the spring biases the cam surface against said at least one bolt.

2. The hinge assembly as claimed in claim 1, wherein the shell is generally a cylinder with at least one planar surface, and the cavity is cylindrical.

3. The hinge assembly as claimed in claim 1, wherein the cam is cylindrical, and a diameter of the cam is less than a diameter of the cavity.

4. The hinge assembly as claimed in claim 1, wherein the spring is a metal coil spring.

5. The hinge assembly as claimed in claim 1, wherein the shaft further comprises a platform located between the neck and the soleplate.

6. The hinge assembly as claimed in claim 1, wherein said bolt is made of moral or plastic and is columnar, and a diameter of said bolt is slightly greater than a diameter of said hole.

7. The hinge assembly as claimed in claim 1, wherein the cam surface extends around the neck between the cam and the soleplate.

8. The hinge assembly as claimed in claim 1, wherein said at least one bolt points toward the neck when said at least one bolt abuts against the cam surface.

9. A portable electronic device comprising:
   a cover;
   a main body; and
   a hinge assembly rotatably joining the cover to the main body; wherein
   the hinge assembly comprises:
   a spring;
   a shaft having a cam, a soleplate and a neck interconnecting the cam and the soleplate, wherein one end of the cam defines a cam surface, and the cam surface comprises at least one peak and at least one valley;
   at least one bolt; and
   a shell encasing the spring and the shaft such that the soleplate is exposed outside of the shell at an open end of the shell, the shell defining at least one hole near the open end, wherein said at least one bolt is received in said at least one hole such that the spring biases the cam surface against part of said at least one bolt.

10. The portable electronic device as claimed in claim 9, wherein the shell is generally a cylinder with at least one planar surface.

11. The portable electronic device as claimed in claim 9, wherein the spring is a metal coil spring.

12. The portable electronic device as claimed in claim 9, wherein the shaft further comprises a platform located between the neck and the soleplate.

13. The portable electronic device as claimed in claim 9, wherein said bolt is made of metal or plastic and is columnar, and a diameter of said bolt is slightly greater than a diameter of said hole.

14. The portable electronic device as claimed in claim 9, wherein the cam surface extends around the neck between the cam and the soleplate.

15. The portable electronic device as claimed in claim 9, wherein said at least one bolt points toward the neck when said at least one bolt abuts against the cam surface.

16. A hinge assembly for portable electronic device, comprising:
    a first rotary member defining a protruding portion thereon;
    a second rotary member defining a cam surface engagable with said protruding portion of said first rotary member; and
    a flexible member and portions of one of said first and second rotary members being receivable in the other of said first and second rotary members, a flexible-force-exerting direction of said flexible member being opposite to an approaching direction along which said protruding portion approaches said cam surface.

17. The hinge assembly as claimed in claim 16, wherein said flexible-force-exerting direction is further opposite to a receiving direction along which said portions of said one of said first and second rotary members moves into said other of said first and second rotary members.

18. The hinge assembly as claimed in claim 16, wherein said protruding portion is located in a way of said portions of said one of said first and second rotary members moving out of said other of said first and second rotary members.

19. The hinge assembly as claimed in claim 16, wherein said cam surface substantially faces a direction same as said flexible-force-exerting direction of said flexible member.

20. The hinge assembly as claimed in claim 16, wherein said second rotary member comprises a neck neighboring said cam surface so that said cam surface extends around said neck, and said protruding portion points toward said neck when said protruding portion abuts against said cam surface.

* * * * *